United States Patent [19]

Taylor

[11] 4,384,494
[45] May 24, 1983

[54] BELT TENSION DETECTOR

[75] Inventor: Derek L. Taylor, Spartanburg, S.C.

[73] Assignee: Milliken Research Corporation, Spartanburg, S.C.

[21] Appl. No.: 295,310

[22] Filed: Aug. 24, 1981

[51] Int. Cl.³ .................. G01L 5/10; D01H 13/32
[52] U.S. Cl. .................... 73/862.45; 57/264; 57/336; 73/862.42; 73/862.48
[58] Field of Search ............... 57/336, 348, 264, 265, 57/105; 73/862.39, 862.42, 862.44, 862.45, 862.46

[56] References Cited

U.S. PATENT DOCUMENTS

| 28,743 | 6/1860 | Duff et al. | 73/862.39 |
| 220,668 | 10/1879 | Sawyer | 73/862.39 |
| 2,401,876 | 6/1946 | Marker et al. | 76/862.45 |
| 2,743,606 | 5/1956 | Webber | 73/862.45 |
| 3,073,156 | 1/1963 | Rowe | 73/862.39 |
| 3,599,485 | 8/1971 | Muhlberg | 73/862.45 |
| 3,979,894 | 9/1976 | Takai | 57/336 |
| 4,144,700 | 3/1979 | Takai et al. | 57/336 X |
| 4,144,701 | 3/1979 | Takai et al. | 57/336 |
| 4,241,616 | 12/1980 | Mastrigt | 73/862.45 |
| 4,296,598 | 10/1981 | Faure | 57/336 X |

Primary Examiner—John Petrakes
Attorney, Agent, or Firm—Earle R. Marden; H. William Petry

[57] ABSTRACT

Method and apparatus to measure and adjust the tension applied to a yarn being false twisted in a belt type false twist mechanism. The fixed belt of a belt type false twister is removed and a tension measuring device is placed over the belt drive pulleys of the removed belt. The tension measuring device has a cam surface which bears against the other belt of the false twist system and automatically records the tension exerted against the cam surface by the other belt.

6 Claims, 6 Drawing Figures

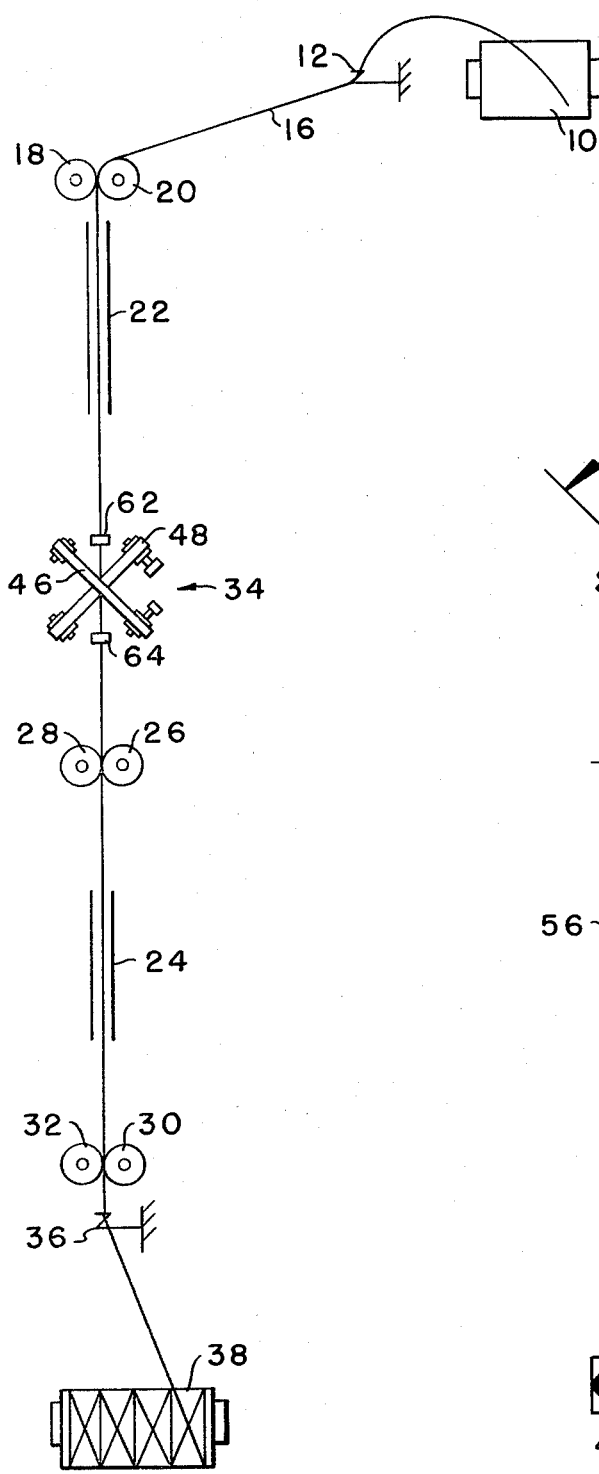
FIG.-1-
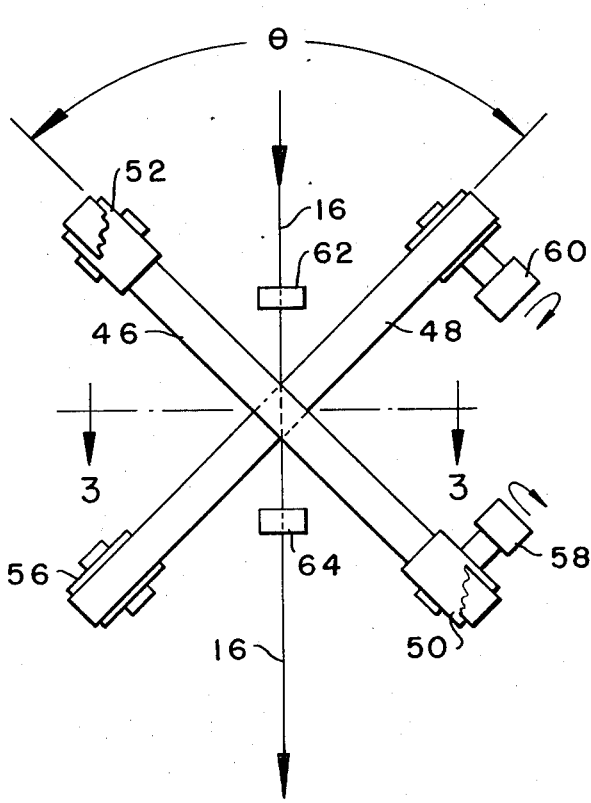
FIG.-2-
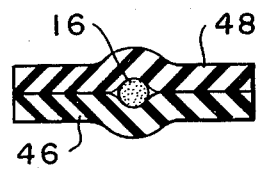
FIG.-3-

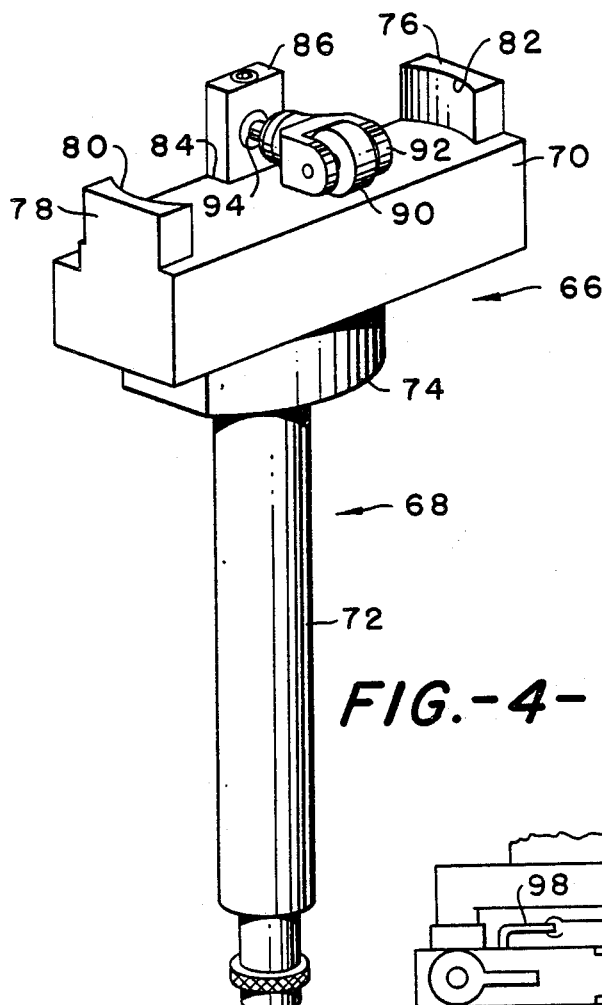
FIG.-4-
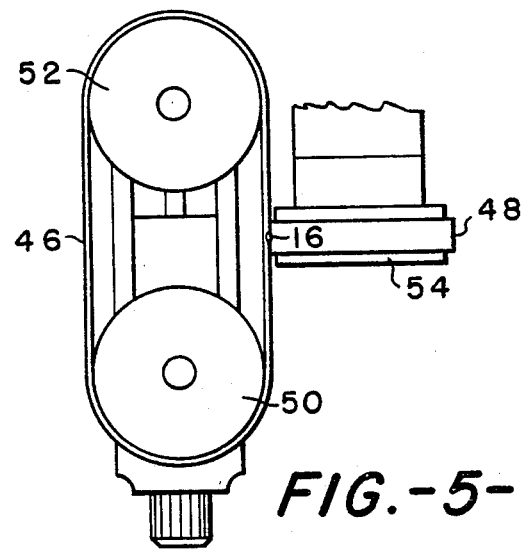
FIG.-5-
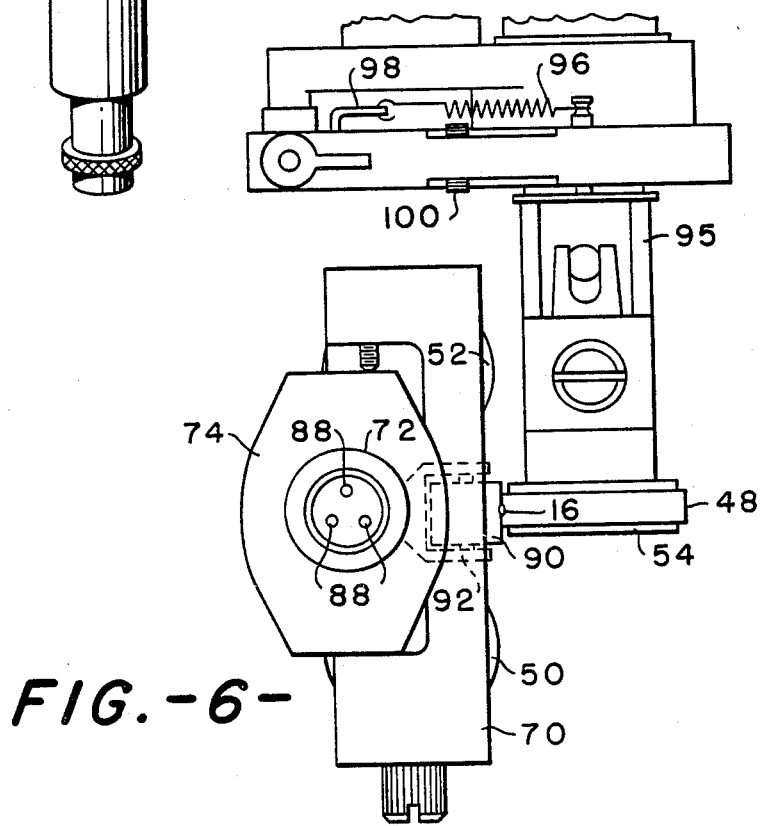
FIG.-6-

BELT TENSION DETECTOR

This invention relates to a belt type false twisting system in which a yarn is run between two rotating endless belts which false twists the yarn therebetween. The characteristics of the yarn being false twisted can be varied by changing the amount of force or tension exerted on the yarn by the belts of the system.

Therefore, it is an object of the invention to provide a method and apparatus to measure and adjust the tension of the belts of a belt false twisting system by adjusting the bias that one belt exerts against the other belt.

Other objects and advantages of the invention will become readily apparent as the specification proceeds to describe the invention with reference to the accompanying drawings, in which:

FIG. 1 is a schematic view of a typical belt type false twisting system;

FIG. 2 is an enlarged view of the belt type false twist mechanism of FIG. 1;

FIG. 3 is a cross-sectional view taken on line 3—3 of FIG. 2;

FIG. 4 is a perspective view of the new tension measuring device;

FIG. 5 is a schematic representation of the relative operating position of the false twist inducing endless belts; and, FIG. 6 is a view of the use of the measuring device of FIG. 4 in the system shown in FIG. 5.

Looking now to the drawings, FIG. 1 illustrates a typical belt type false twisting system for continuous filament synthetic yarn such as nylon, polyester, etc. From the yarn package 10, the yarn 16 to be false twisted is delivered successively through the primary heater 22, the belt false twist system 34, the secondary heater 24 to the take-up roll 38 through the guide 36 by three sets of nip rolls 18, 20; 26, 28 and 30, 32. The yarn can be fully drawn or partially oriented and is treated by the belt system 34 in the manner shown in detail in FIGS. 2 and 3 and explained hereafter.

FIGS. 2 and 3 show the basic action of the belt false twist mechanism and will be explained in further detail. The false twist apparatus generally indicated as 34 comprises two endless flat surfaced belts 46 and 48, forming a pair, which are made of, for example, a synthetic rubber to have work surfaces, respectively, of a small friction coefficient therebetween. These endless belts 46 and 48 are supported on pulley 50, 52 and 54, 56, respectively, so as to provide straightly extending regions between their respective associated pulleys. These belts 46 and 48 are driven in different directions indicated by the arrows shown, by means of drive pulleys, 58 and 60, respectively. These drive pulleys are driven synchronously through, for example, synchronous motors so shown, to insure that the belts 46 and 48 are caused to run in their own direction at the same surface velocity. As shown in FIG. 2, these two endless belts 46 and 48 thus travel in different directions at a predetermined angle at the same speed while their surface comes into contact with each other successively at the site of their crossing.

The filament yarn 16 which is subjected to heating, upstream of the false twisting apparatus 34, by the heating unit 22, and via an inlet guide 62, the filament yarn 16 is passed progressively through the region of an angle which is defined between the straightly extending regions of the two endless belts 46 and 48 which travel in different directions. Therefrom, the filament yarn 16 enters progressively into the twisting zone, i.e., between the contacting surfaces of the crossing straightly extending regions of the two running belts 46 and 48, where the filament yarn 16 is twisted while being nipped successively along its length between these contacting surfaces of the running belts 46 and 48, while being urged, at the same time, to be discharged successively from the nipping zone. Therefrom, the filament yarns which is now set free to be untwisted loose is taken onto the take-up device via an outlet guide 64.

The tension measuring device per se (FIG. 4), designated by reference number 66, basically consists of an electronic tensiometer 68 of the type manufactured by Rothschild of Zurich, Switzerland and the sensing head 70. The tensiometer 68 has two major components, namely the barrel 72 which houses the differential capacitor and the tensiometer head 74 which accommodates the tension receiving element. The sensing head 70 has two upstanding flange portions 76 and 78 with inner concave surfaces 80 and 82, respectively, which conform to the radius of the pulleys for the belts. The center line between the concave surfaces 80 and 82 is at least equal to the major axis of the belt 46 in FIG. 5. The back portion of the head 70 has a groove 84 therein to accommodate the rectangular member 86 which projects downward to telescope a connecting member (not shown) inserted in the top of head 74 to operably connect the rectangualr member 86 to the tension receptive member of electronic tensiometer. This allows pressure or tension on the rectangular member to change or vary the capacitance of the differential capacitor of the tensiometer which in turn controls a bridge voltage which is amplified, rectified and supplied to a recording device. As noted in FIG. 6, contacts 88 are located in the bottom of the barrel for connection to the appropriate recording device.

To sense the tension, as hereinafter explained, a roll 90 is rotably mounted in a swivel 92 mounted on a shaft 94 which transmits pressure from the surface contacted by the roll to the rectangular member 86 to provide a measuring force for the electronic tensiometer.

FIG. 5 illustrates the belt twisting device 34 in operative position showing belt 46 mounted on pulleys 50 and 52 located at angle of approximately 90° to the belt 48 on pulleys 54 and 56. Yarn 16 is shown being twisted between the belts 46 and 48.

OPERATION

Looking now to FIG. 6, the operation of tension measuring device of FIG. 4 will be explained. For the sake of discussion, the support for belt 46 is fixed and the support 95 for the belt 48 is pivotally mounted and biased toward the belt 46 by the spring 96. The spring 96 is connected to a slidable rod member 98 which can be moved backwards and forwards by the knurled knob 100 to lessen or increase the bias of the spring 96.

For a known result in the yarn 16, the tension exerted by the belt 48 is pre-determined. To measure and adjust this tension, the belt 46 is removed and the tensioning measuring device 66 is placed as shown in FIG. 6 with the concave surfaces 80 and 82 engaging, respectively, the outer peripheries of the pulleys 50 and 52 placing the roll 90 into engagement with the belt 48. The belt 48 will exert a force on the roll 90 which will be transmitted to the electronic tensiometer 68 and read out on the selected read out device connected to the terminals 88. Then the knurled knob can be rotated to allow the rod 98 to adjust the bias of the spring 96 until the predetermined read out is obtained which corresponds to the desired tension of the belt 48. Then the tension measuring device 66 is removed, the belt 46 replaced on the pulleys and the belt false twister 34 placed back in operation.

It can readily be seen that a novel tensioning measuring device has been provided which will automatically allow the tension in a belt false twisting system to read and be adjusted without constant trial and error adjustment.

Although the preferred embodiment of the invention has been described, it is contemplated that many changes may be made without departing from the scope or spirit of the invention and I, therefore, desire to be limited only by the claims.

I claim:

1. A tension measuring device for a belt type false twist device comprising: an electronic tensiometer, a sensing head mounted on said electronic tensiometer, a pair of spaced, opposed flange members connected to said sensing head and adapted to contact the pulleys of a belt type false twist device, a tension responsive means operably associated with said sensing head and said tensiometer and a second means operably associated with said tension response means to sense the tension in a belt member.

2. The device of claim 1 wherein each of said flanges have a concave surface to conform to the periphery of the belt pulleys.

3. The device of claim 1 wherein said second means includes a rotatably mounted roll member.

4. The device of claim 3 wherein said second means includes a swivel mount for said roll member.

5. The device of claim 4 wherein each of said flanges have a concave surface to conform to the periphery of the belt pulleys.

6. The method of measuring and adjusting the tension exerted by the belts of a belt type false twisting system having at least a pair of belts in which one of the belts is mounted on pulleys in a fixed position and the other belt is pivotally mounted comprising the steps of: removing the belt mounted in a fixed position from its pulleys, placing a tension measuring device having a universally mounted roll member over the pulleys from which the belts is removed with the universally mounted roll member in contact with the belt of the pivotally mounted belt, measuring and recording the tension of the pivotally mounted belt and changing the bias of the pivotally mounted belt with respect to the position of the tension measuring device in accordance with the recorded tension.

* * * * *